United States Patent
Uchiyama

(10) Patent No.: US 7,293,844 B2
(45) Date of Patent: Nov. 13, 2007

(54) RUBBER CRAWLER TRACK

(75) Inventor: Tsuyoshi Uchiyama, Fukuyama (JP)

(73) Assignee: Fukuyama Gomu Kogyo Kabushiki Gaisha, Fukuyama (JP)

( * ) Notice: Subject to any disclaimer, the term of this patent is extended or adjusted under 35 U.S.C. 154(b) by 0 days.

(21) Appl. No.: 10/514,993

(22) PCT Filed: May 22, 2003

(86) PCT No.: PCT/JP03/06433

§ 371 (c)(1),
(2), (4) Date: Nov. 19, 2004

(87) PCT Pub. No.: WO03/097434

PCT Pub. Date: Nov. 27, 2003

(65) Prior Publication Data
US 2006/0061212 A1    Mar. 23, 2006

(30) Foreign Application Priority Data
May 22, 2002    (JP) .............................. 2002-147342

(51) Int. Cl.
*B62D 55/253* (2006.01)

(52) U.S. Cl. ....................... 305/166; 305/171; 305/176; 305/177

(58) Field of Classification Search ................. 305/165, 305/166, 167, 171, 172, 173, 174, 175, 176, 305/177, 179
See application file for complete search history.

(56) References Cited

U.S. PATENT DOCUMENTS 6,568,769 B1 *   5/2003   Watanabe et al. ........... 305/171

FOREIGN PATENT DOCUMENTS

| JP | 52-68532 | | 5/1977 |
|---|---|---|---|
| JP | 53-50935 | | 4/1978 |
| JP | 55-140663 | * | 11/1980 |
| JP | 56-043068 | * | 4/1981 |
| JP | 56-090776 | * | 7/1981 |
| JP | 59-032576 | * | 2/1984 |
| JP | 2-93194 | | 7/1990 |
| JP | 2-148894 | | 12/1990 |
| JP | 5-170148 | * | 7/1993 |
| JP | 06-061672 | | 8/1994 |
| JP | 11-079015 | | 3/1999 |
| JP | 11-105754 | | 4/1999 |
| JP | 11-268673 | | 5/1999 |
| JP | 2000-085642 | | 3/2000 |
| JP | 2000-3077064 | | 6/2000 |
| JP | 2000-313373 | | 11/2000 |

* cited by examiner

*Primary Examiner*—Russell D. Stormer
(74) *Attorney, Agent, or Firm*—Merek, Blackmon & Voorhees, LLC

(57) ABSTRACT

A rubber crawler track (1) has an endless rubber belt-shaped rubber crawler track main body (2) formed of a rubber elastic body and core metal pieces (3) embedded in the rubber crawler track main body (2) at predetermined intervals in a circumferential direction of the rubber crawler track, wherein a high hardness intermediate rubber layer track main body (2) is provided from below at least the ground contacting surface side of an end portion in a length direction (rubber crawler track width direction) of the core metal pieces (3) toward outside the end portion in a width direction of the rubber crawler track. The rubber elastic body of the rubber crawler track main body (2) is formed in a multiply layered structure with at least two or more layers.

3 Claims, 16 Drawing Sheets

A

B

PRIOR ART

A

PRIOR ART

B

PRIOR ART

PRIOR ART

* imitation exist

Table 1

RUBBER CRAWLER TRACK

TECHNICAL FIELD

The present invention relates to a rubber crawler track mounted on an endless track traveling device for farm working machines, construction machines, engineering work machines, and industrial vehicles such as transportation vehicles. Particularly, the present invention prevents a large crack in the circumferential direction in the rubber crawler track main body in an end portion in a width direction of a rubber crawler track from occurring.

TECHNICAL BACKGROUND

Although an iron crawler track has been conventionally used as an endless track traveling device for mobile construction machine vehicles and so on, it has recently come to be used in work on pavement in town areas. Therefore, a link-type rubber crawler track or an integral rubber crawler track is used with the iron crawler track. Here, the link-type rubber crawler track is so constructed that backing shoes having rubber elastic bodies are integrally cured and bound on metallic shoe plates instead of the iron crawler track, or rubber pads having rubber elastic bodies are directly cured and bound on exclusive core metal pieces instead of the metallic shoe plates being mounted on a link comprising a plurality of endlessly-connected track links. Besides, the integral rubber crawler track comprises rubber pad shoes detachable on the metallic shoe plates of the iron crawler track, a tensile strength layer, core metal pieces embedded in an inside circumference of the tensile strength layer at predetermined intervals, and core metal piece guide protrusions for preventing the crawler track from coming off out of the traveling device. The tensile strength layer is so constructed that a plurality of tensile strength materials are arranged and embedded in an endless rubber crawler track main body formed of a rubber elastic body shown in FIG. 13 within a width direction of a rubber crawler track along its circumferential direction to form tensile strength material rows. The core metal piece guide protrusions are formed so as to project toward the inside circumference of the rubber crawler track. Besides, a rubber pad is made in a unit type of a track link length or a continuous type of a length over a plurality of links.

When the conventional rubber crawler track is used in narrow places, on rough ground with many stones, or around a curb in a shoulder of a road, it runs aground on the stones, obstacles, and the curb (FIG. 14A), or is pressed in a lateral direction (FIG. 14B). Therefore, a rubber elastic body put between an end portion of a crawler track width direction in a core metal piece limb embedded in the rubber crawler track and the stones and so on is deformed greatly. Therefore, the rubber elastic body is broken. Whenever such a state is repeated, destruction of the rubber elastic body progresses, thereby finally causing a large crack in the circumferential direction in the rubber crawler track main body.

Some inventions have been proposed to prevent a large crack from occurring in the circumferential direction in the rubber crawler track main body.

For example, an invention for preventing a large crack from occurring in the circumferential direction in the rubber crawler track main body by bending an end portion of a crawler track width direction in a core metal piece limb toward the inside circumference (the ground not-contacting surface) is disclosed in Japanese Patent No. 3077064, Japanese Patent Laid-open Publication Nos. 1999-079015 and 2000-313373. Besides, an invention for preventing a large crack from occurring in the circumferential direction in the rubber crawler track main body by curving an end portion of a crawler track width direction in a core metal piece limb toward the inside circumference (the ground not-contacting surface) is disclosed in Japanese Patent Laid-open Publication No. 1999-268673.

Besides, in Japanese Patent Laid-open Publication No. 1999-105754, an end portion of a crawler track width direction in a core metal piece limb is formed in a round rib configuration to reduce the occurrence of a large crack in the circumferential direction in the rubber crawler track main body.

However, in the above-mentioned inventions, the cost can not be prevented from being raised because a core metal piece molding configuration and processes for making core metal pieces, such as a core metal piece finishing, are complicated in addition to the shape of the core metal piece being complicated.

In addition, in Japanese Utility Model Laid-open publication No. 1977-068532, a reinforcing rib is formed by increasing the thickness of rubber of the ground contacting surface side corresponding to both ends of a crawler track width direction in a core metal piece limb to prevent a large crack from occurring in the circumferential direction in the rubber crawler track main body. Moreover, in Japanese Utility Model Laid-open publication No. 1978-050935, a rubber crawler track has a thick protrusive bar around an end portion of a crawler track width direction in a core metal piece.

However, in the above-mentioned invention, although rubber near the core metal piece limb can be prevented from bending and deforming, rubber outside (the ground contacting surface side) the reinforcing rib or the thick protrusive bar is easy to bend and deform. Accordingly, a large crack in the circumferential direction in the rubber crawler track main body occurs on these portions, and an efficient improvement has not been achieved yet.

Furthermore, in Japanese Patent No. 3077064, to prevent a large crack from occurring in the circumferential direction in the rubber crawler track main body, a cable layer is provided below the ground contacting surface side of a portion of a crawler track width direction of a core metal piece limb, and a synthetic resin material is arranged near the end portion of a crawler track width direction of a core metal piece.

In Japanese Laid-open Publication No. 2000-085642, a low frictional resistive member is embedded in a taper portion of an end of a crawler track width direction in a rubber lug so that the surface is exposed. However, a large crack in the circumferential direction in the rubber crawler track main body cannot be effectively and economically prevented by this method.

The present invention aims to settle the above-mentioned problems and to provide a rubber crawler track capable of preventing a large crack from occurring in the circumferential direction in the rubber crawler track main body effectively and economically.

SUMMARY OF THE INVENTION

The present invention relates to a rubber crawler track having an endless rubber belt-shaped rubber crawler track main body formed of a rubber elastic body, etc. and core metal pieces embedded in the rubber crawler track main body at predetermined intervals in a circumferential direction of the rubber crawler track. And therein, a high hardness intermediate rubber layer formed of a high hardness rubber elastic body having higher hardness than other rubber elastic bodies forming the rubber crawler track main body is provided from below at least the ground contacting surface side of an end portion in a length direction (rubber crawler track width direction) of the core metal pieces toward outside an end portion in a width direction of the rubber crawler track. The present invention is characterized by the rubber elastic body of the rubber crawler track main body being formed in a multiply layered structure with at least two or more layers.

In the rubber crawler track of the present invention, the core metal pieces embedded in the rubber crawler track main body have end portions in the length direction (end portions of core metal piece limbs) with tips turned toward the ground contacting surface side to form downward inclinations within a predetermined length.

Besides, the present invention is characterized by bulgy portions arranged between rubber lugs in the circumferential direction of the rubber crawler track. The bulgy portions are formed by suitably making thick the rubber of the ground contacting surface side in the rubber crawler track width direction, including portions corresponding to the end portions in the length direction of the core metal pieces (the thickness of a base rubber).

In the rubber crawler track of the present invention, since the high hardness intermediate rubber layer formed of the high hardness rubber elastic body having higher hardness than other rubber elastic bodies forming the rubber crawler track main body is provided from below at least the ground contacting surface side of the end portion in the length direction of the core metal pieces toward outside the end portion in the width direction of the rubber crawler track, and the rubber elastic body of the rubber crawler track main body is formed in a multiply layered structure with at least two or more layers, when the rubber crawler track runs aground on stones or curbs, strain occurring on the rubber elastic body of the rubber crawler track main body between the end portions of the core metal piece limbs and the stones or the curbs is effectively dispersed. Therefore, the strain is prevented from concentrating on a part, thereby preventing rubber destruction from occurring and effectively diminishing the occurrence of a large crack in the circumferential direction in the rubber crawler track main body. Accordingly, the durability of the rubber crawler track can be improved.

Besides, in the present invention, a large crack in the circumferential direction in the rubber crawler track main body can be sufficiently prevented by merely making a part of the rubber elastic body into the intermediate rubber layer having higher hardness than other rubber elastic bodies. Since it is unnecessary to use expensive materials (for example, steel cords, etc.) that increase the material cost in addition to the complicated production process, a large crack in the circumferential direction in the rubber crawler track main body can be prevented economically and effectively.

In this case, the intermediate rubber layer can be designed and used in a desirable optional combination of exclusive rubber.

In the second characterization of the present invention, the outside circumference (ground contacting surface side) of the rubber crawler track in the end portion in a length direction of the core metal piece is formed in a downward inclination within a predetermined length toward the ground contacting surface side. By this, the strain of the rubber between the end portions of the core metal piece limbs and the stones or the curbs is prevented from concentrating on a part, thereby preventing the rubber destruction from occurring and diminishing the occurrence of a large crack in the circumferential direction in the rubber crawler track main body.

Since the core metal pieces are merely provided with inclinations on the end portions of their limbs in comparison with the conventional ones whose end portions of the length direction are bent to an inside circumferential side, the improvement of the shape can be simply achieved. Therefore, the cost is not increased. Here, the inclination of the end portion of the length direction of the core metal piece may be a convex curved surface.

In the third characterization of the present invention, the thickness of the ground contacting surface (the outside circumference) side of the rubber crawler track in the end portion of the rubber crawler track width direction including the portion corresponding to the end portion of the length direction of the core metal piece is made suitably thick, and the bulgy portion is arranged between the rubber lugs thereof. By this, the rigidity of the end portions in the width direction of rubber crawler track is increased. When the rubber crawler runs aground on or is pressed against the stones or the curbs, the end portions of the width direction of the rubber crawler track turn to be difficult to be bent to the inside circumferential side (ground not-contacting surface side). When the end portions of the width direction of the rubber crawler track are bent to the inside circumferential side, the strain of the rubber elastic body corresponding to the end portions of the length direction of the core metal piece can be reduced. Therefore, the occurrence of a large crack in the circumferential direction in the rubber crawler track main body can be reduced.

Besides, in the rubber crawler track combining the above-mentioned features, the ability for preventing a large crack from occurring in the circumferential direction in the rubber crawler track main body is better than for the conventional method. Therefore, the durability of the rubber crawler track can be improved.

BRIEF DESCRIPTION OF THE DRAWINGS

FIG. 1A is a plan view of the inside circumferential side (ground not-contacting surface side), FIG. 1B is a plan view of the outside circumferential side (ground contacting surface side), and FIG. 1C is a sectional view in a width direction of the rubber crawler track.

FIG. 6A is a plan view of the inside circumferential side (ground not-contacting surface side), FIG. 6B is a plan view of the outside circumferential side (ground contacting surface side), FIG. 6C is a front view, and FIG. 6D is a side view.

FIG. 8A is a plan view of the outside circumferential side (ground contacting surface side), FIG. 8B is a plan view of the inside circumferential side (ground not-contacting surface side) and FIG. 8C is a sectional view in a width direction of the rubber crawler track.

PREFERRED EMBODIMENTS OF THE INVENTION

Hereafter, embodiments of the present invention will be described with reference to the drawings.

Figure 1:
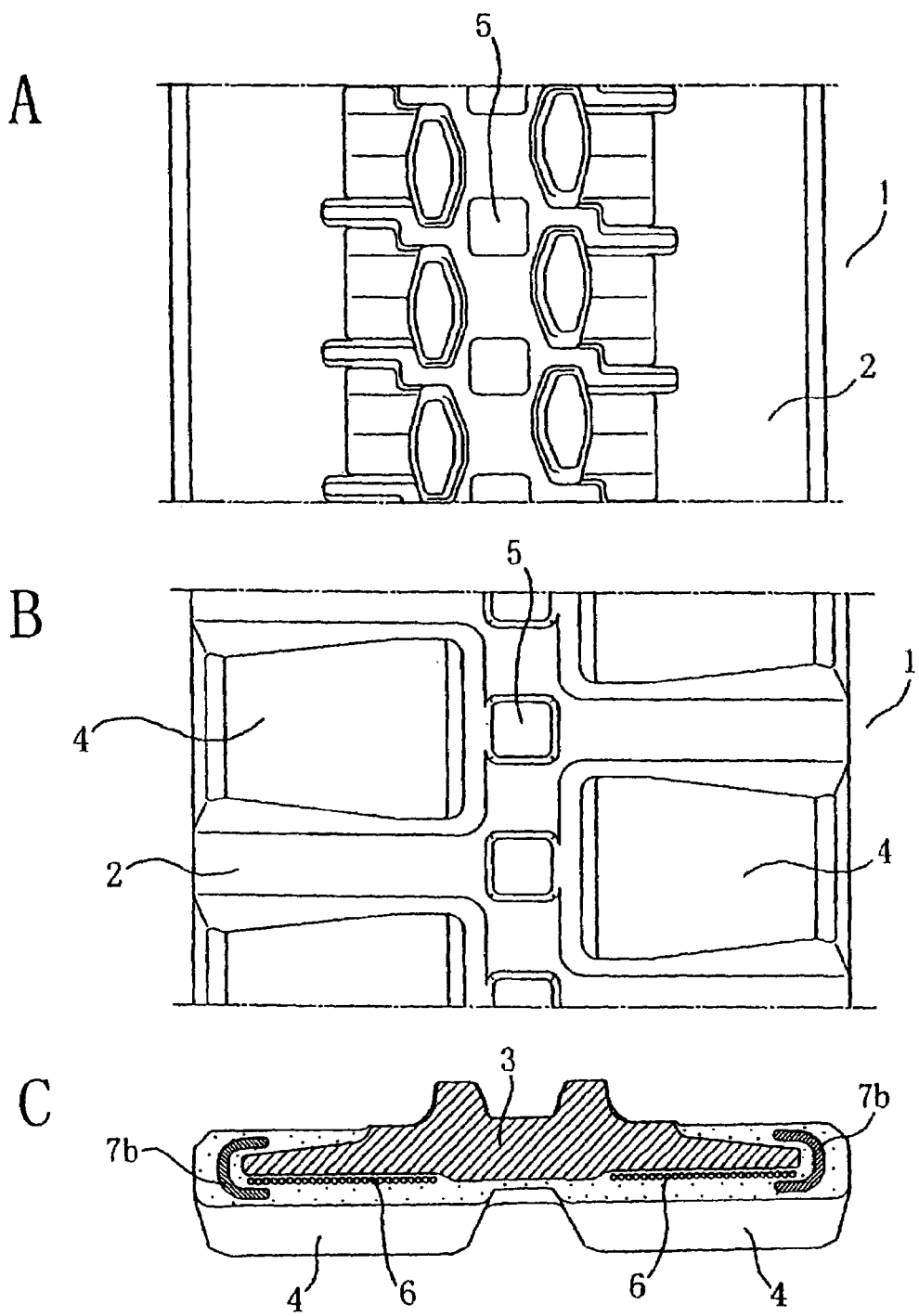
FIG. 1 show a rubber crawler track of the first embodiment.
Figure 2:
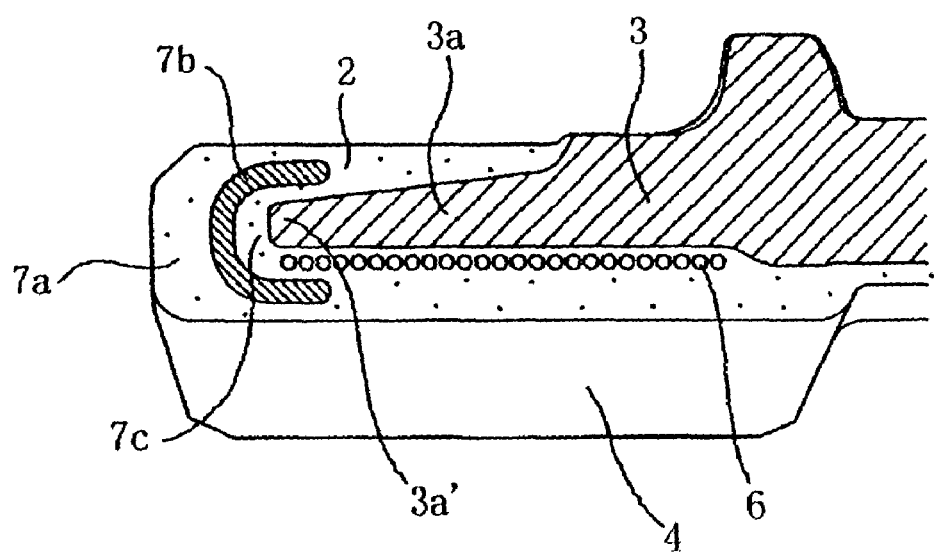
FIG. 2 is an enlarged view of an important part of FIG. 1C.

FIG. 1A is a plan view of the inside circumferential side (ground not-contacting surface side) of a rubber crawler track of the first embodiment of the present invention. FIG. 1B is a plan view of the outside circumferential side (ground contacting surface side). FIG. 1C is a sectional view in a width direction of FIG. 1B. FIG. 2 is an enlarged view of an important part of FIG. 1C.

A rubber crawler track 1 of the first embodiment comprises an endless rubber belt-shaped rubber crawler track main body 2 formed of a rubber elastic body, etc. and core metal pieces 3 embedded therein at predetermined intervals in a circumferential direction. Rubber lugs 4 are protrusively formed on the ground contacting surface side of the rubber crawler track 1. Steel cord rows 6 are embedded on the outside circumferential side of the core metal pieces 3 along the circumferential direction of the rubber crawler track so as to be divided to the left and right of engaging holes 5 that interlock with a driving wheel of a travelling device. A rubber elastic body covering an end portion 3a' of a limb 3a of a core metal piece 3 is made in three-layers, comprising an outside rubber layer 7a, an intermediate rubber layer 7b and an inside rubber layer 7c. The intermediate rubber layer 7b is harder than the outside rubber layer 7a and the inside rubber layer 7c. Accordingly, when the rubber crawler track runs aground on stones or a curb, strain occurring on the rubber elastic body between the end portion 3a' and the stones or curb is dispersed by the high hardness intermediate rubber layer 7b. Therefore, the strain is prevented from concentrating on a part and the rubber elastic body is not broken, thereby preventing a large crack from occurring in the circumferential direction in the rubber crawler track main body.

Besides, in the first embodiment, the rubber hardness (JIS K6253:1997; Durometer A hardness) of the outside rubber layer is 69 degrees, that of the intermediate rubber layer is 85 degrees, and that of the inside rubber layer is 69 degrees. The thickness of the intermediate rubber layer is 6 mm. In the present embodiment, although it is clearly stated that the outside rubber layer is different from the inside rubber layer, for convenience' sake, in the first embodiment, they are formed of a rubber elastic body with the same rubber hardness and the same rubber compound. Accordingly, if the outside rubber layer and the inside rubber layer are regarded as the same layer, the present embodiment is formed in a two-layer structure.

In the above-mentioned embodiment, although the rubber hardness (JIS K6253:1997; Durometer A hardness) of the intermediate rubber layer is harder than those of the outside rubber layer and the inside rubber layer by 16 degrees, it is not limited to this in the present invention. In the case of a rubber crawler track being used under normal conditions, the rubber hardness of the intermediate rubber layer may be harder than those of the outside rubber layer and the inside rubber layer by 16 degrees at least over 4 to 7 degrees of Durometer A hardness.

In this case, when the rubber hardness (JIS K6253:1997; Durometer A hardness) of the intermediate rubber layer is over 95 degrees, the flexibility of the rubber elastic body goes down, thereby causing early flexing fatigue and decreasing durability. Therefore, it is not preferable to use a high hardness rubber elastic body having a hardness more than this.

Accordingly, the rubber hardness (JIS K6253:1997; Durometer A hardness) of the outside rubber layer or the inside rubber layer is set up within the range of 50 degrees to 90 degrees, which is the same range as the conventional rubber crawler track. The intermediate rubber layer is formed of a rubber elastic body harder than the outside rubber layer and the inside rubber layer by at least more than 4 degrees of Durometer A hardness. And it is preferable that the upper limit of the rubber hardness (JIS K6253:1997; Durometer A hardness) is about 95 degrees. Usually, the rubber hardness of the rubber elastic body might just as well be set up within the range of 54 degrees to 95 degrees of Durometer A hardness. The hardness of each rubber layer, the number of layers and the thickness of the layer are decided in accordance with the weight of a vehicle and a machine, specification and the requisite durability, and besides, may be suitably designed in consideration of the material of the rubber due to the combination of the rubber in the rubber elastic body. The hardness need not be always within the above-mentioned range.

Figure 3:
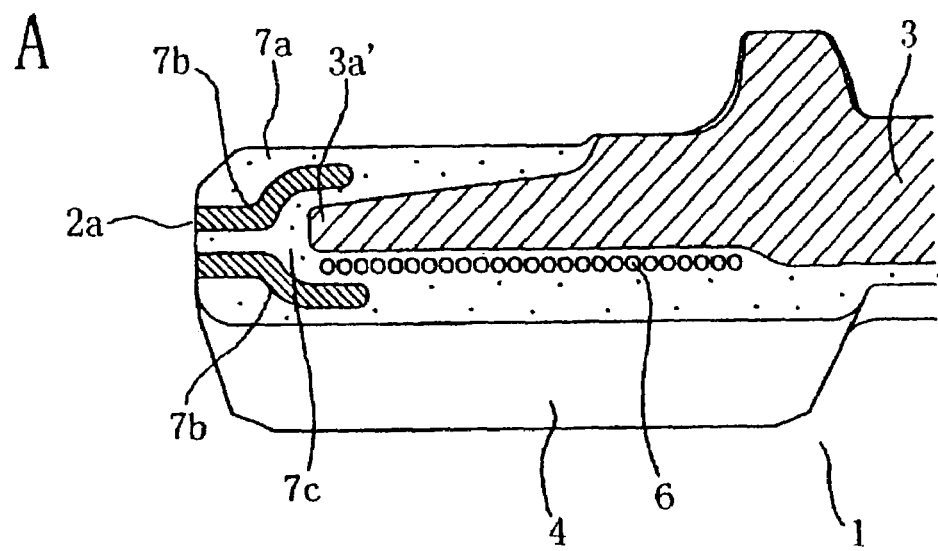
FIG. 3 is an enlarged sectional view of an important part in a width direction of a rubber crawler track showing another example of the first embodiment.
Figure 3:
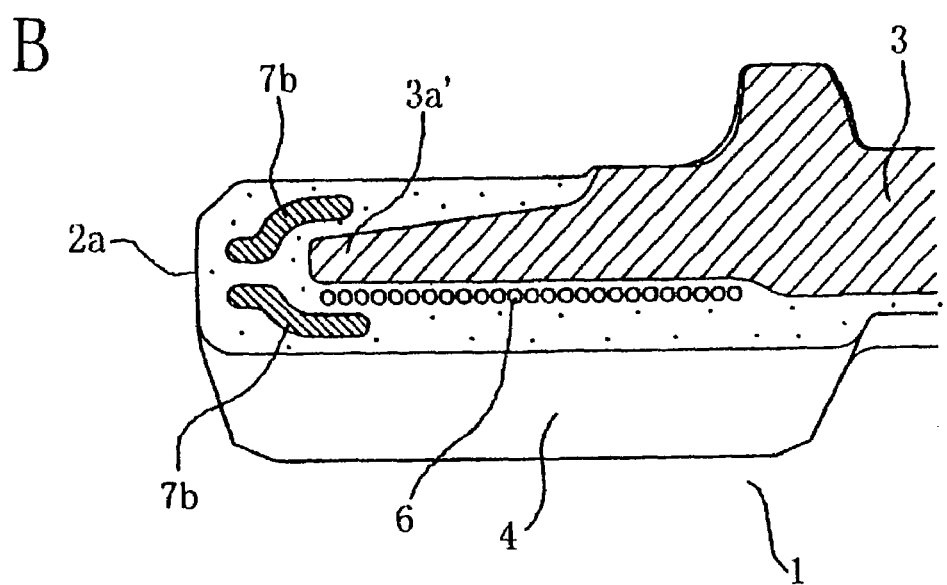

FIG. 3 is an enlarged sectional view of an important part in a width direction of a rubber crawler track showing another example of the first embodiment.

FIG. 3A shows a rubber crawler track 1 of another example wherein the intermediate rubber layer 7b extends to a side end portion 2a thereof. The intermediate rubber layer 7b is formed of a high hardness rubber elastic body covering an end portion 3a' of the core metal piece limb, and divided into an inside circumferential side and an outside circumferential side with respect to the crawler track in a vertical direction. Here, the high hardness intermediate rubber layer 7b is arranged in a plurality of layers.

FIG. 3B shows a rubber crawler track of another example 2 wherein the intermediate rubber layer 7b of the example 1 does not reach the side end portion 2a.

Figure 4:
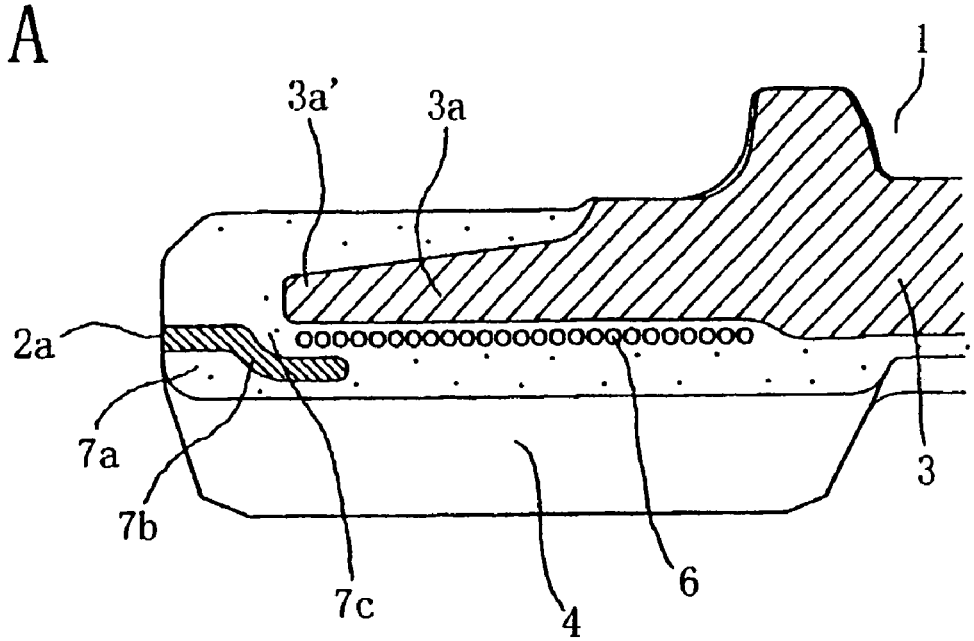
FIG. 4 is an enlarged sectional view of an important part in a width direction of a rubber crawler track showing a further example of the first embodiment.
Figure 4:
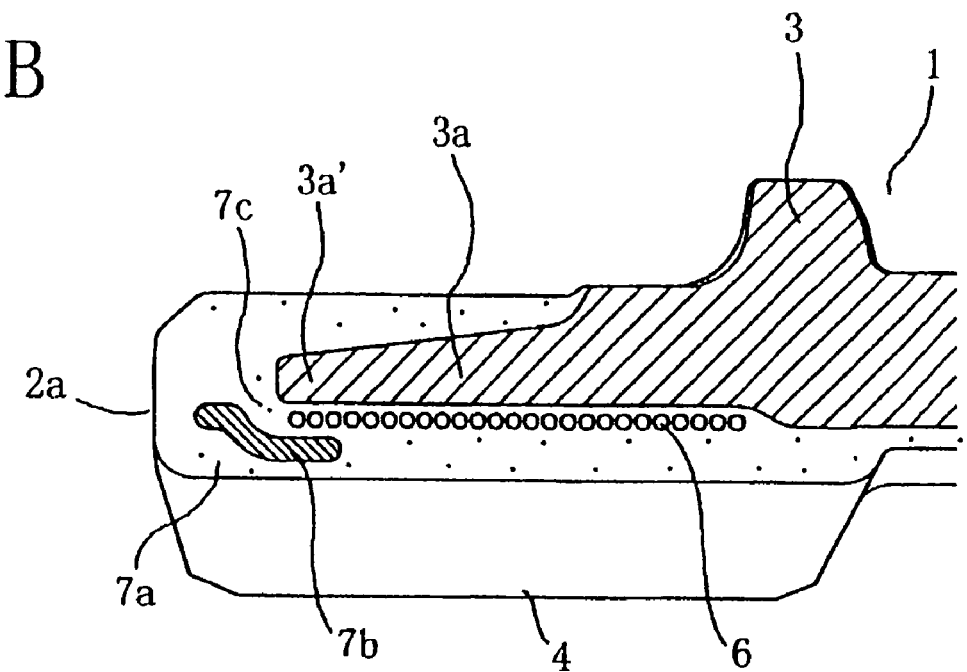

FIG. 4 is an enlarged sectional view of an important part in a width direction of a rubber crawler track showing a further example of the first embodiment.

FIG. 4A shows a rubber crawler track of another example wherein the intermediate rubber layer 7b of high hardness rubber elastic body covering the end portion 3a' of the core metal piece limb is provided near the underside of the ground contacting surface side of the rubber crawler track in the vertical direction. In this case, the intermediate rubber layer 7b extends to the side end portion 2a of the rubber crawler track.

FIG. 4B shows a rubber crawler track of another example wherein the intermediate rubber layer 7b of the example of FIG. 4A does not reach the side end portion 2a.

Figure 5:
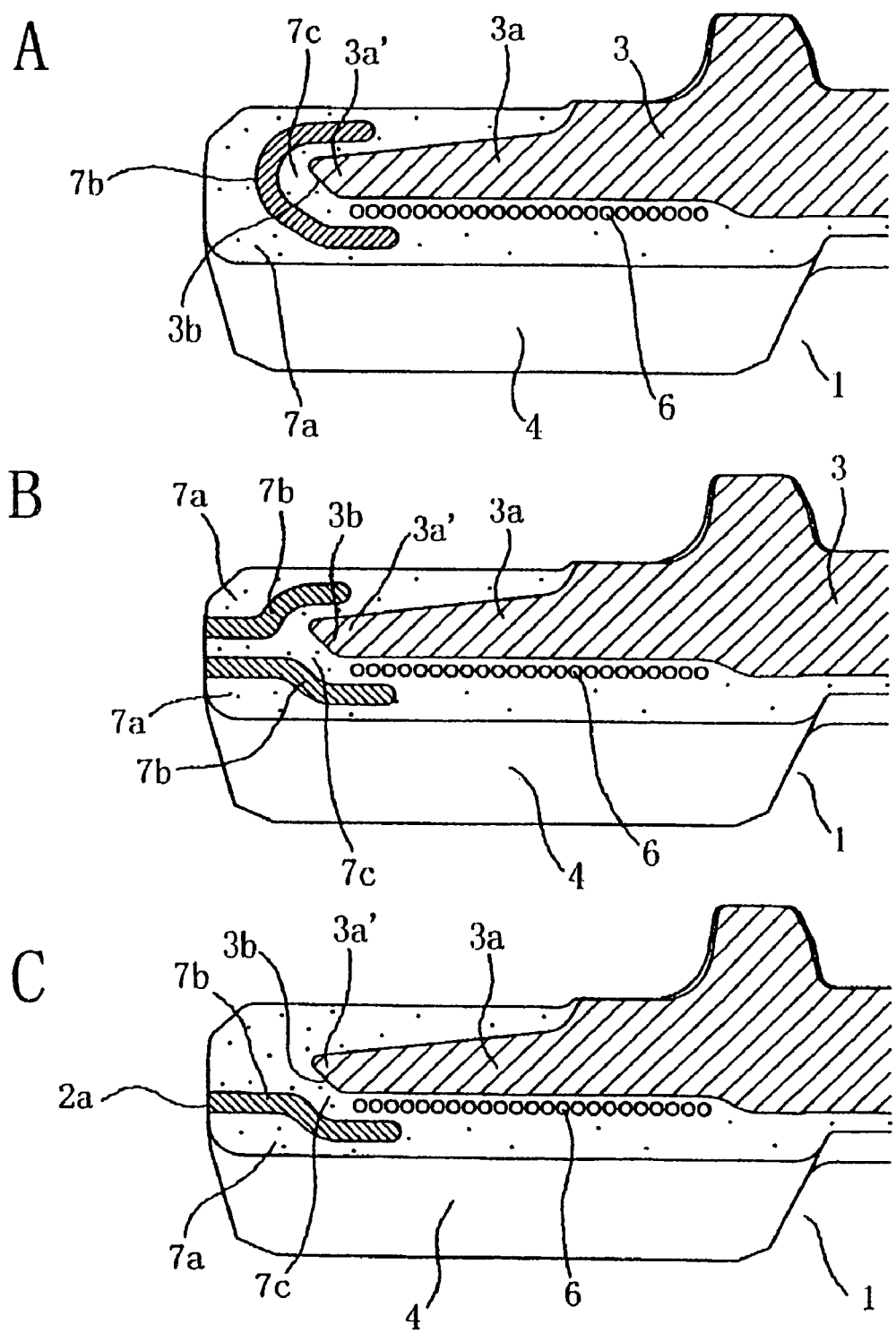
FIG. 5 is a sectional view in a width direction of a rubber crawler track of a second embodiment.
Figure 6:
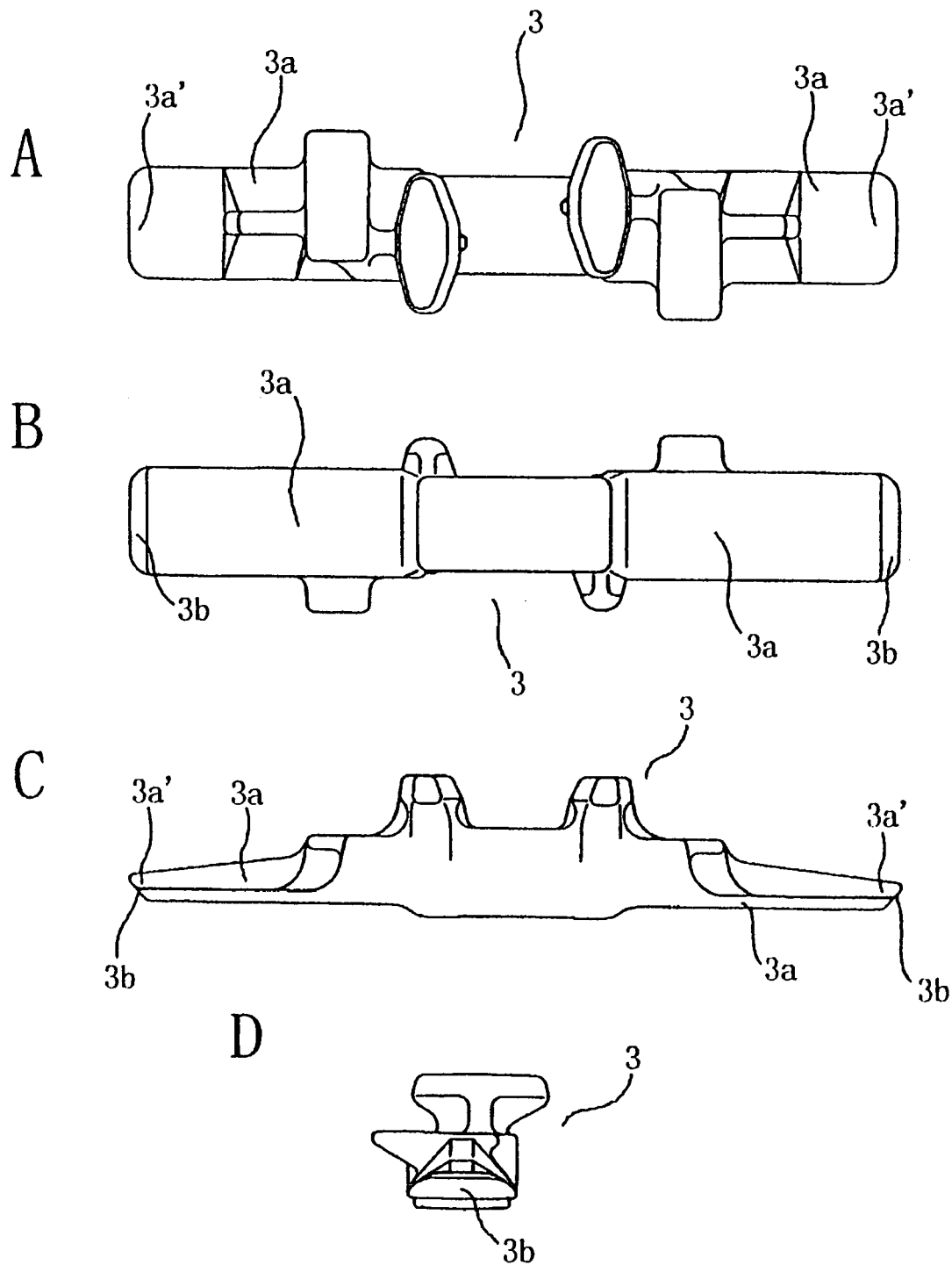
FIG. 6 show a core metal piece embedded in a rubber crawler track main body of the second embodiment.

FIG. 5 is a sectional view in a width direction of a rubber crawler track of a second embodiment. FIG. 6 show a core metal piece embedded in a rubber crawler track main body of the second embodiment. FIG. 6A is a plan view of the inside circumferential aide (ground not contacting surface side), FIG. 6B is a plan view of the outside circumferential side (ground contacting surface side), FIG. 6C is a front view, and FIG. 6D is a side view.

A rubber crawler track 1 of the second embodiment is so constructed that core metal pieces 3 in FIG. 6 are embedded in the rubber crawler track 1 of the first embodiment. Each core metal piece 3 includes an inclination 3b, by which end portions in a length direction of the core metal piece are inclined toward the ground contacting surface side within a fixed length.

In this embodiment, the rubber elastic body covering the end portion 3a' including the inclination 3b of the core metal piece limb is made in a three-layer structure comprising an outside rubber layer 7a, an intermediate rubber layer 7b and an inside rubber layer 7c. The hardness of the intermediate rubber layer 7b is made to be higher than that of the outside rubber layer 7a or the inside rubber layer 7c.

Accordingly, strain imposed on the rubber elastic body by stones or curbs is suitably dispersed by the high hardness intermediate rubber layer covering the end portion 3a' of the core metal piece limb and the inclination 3b thereof, thereby effectively preventing a large crack from occurring in the circumferential direction in the rubber crawler track main body. Therefore, the rubber crawler track can improve in durability.

Figure 7:
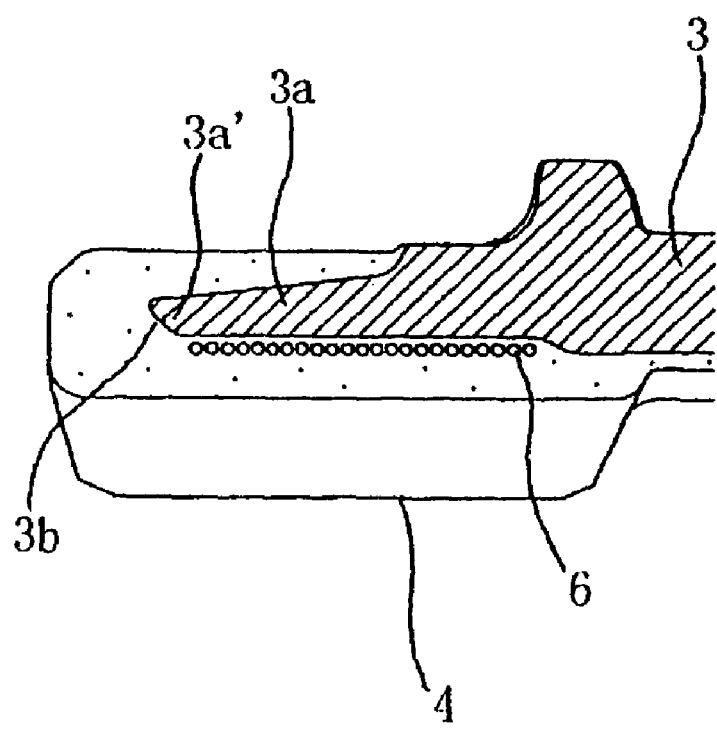
FIG. 7 is an enlarged sectional view of an important part of a rubber crawler track of a third embodiment.

FIG. 7 is an enlarged sectional view of an important part of a rubber crawler track of a third embodiment.

Core metal pieces 3 embedded in the rubber crawler track 1 of the third embodiment are so constructed that each has an inclination 3b formed on the crawler track ground contacting surface side of the end portion 3a' in FIG. 6 of the second embodiment.

In this embodiment, the intermediate rubber layer formed of the high hardness rubber elastic body does not lie within the rubber crawler track main body. Although the effect for preventing a large crack from occurring in the circumferential direction in the rubber crawler track main body is inferior to that of the second embodiment, an equal effect can be gained according to the above-mentioned core metal pieces. Even if the rubber crawler track 1 runs aground on the stones or curbs, strain is not concentrated on a part of the rubber elastic body put between the end portion 3a' and them, and is effectively dispersed and lightened by the core metal piece shape. Therefore, a rubber elastic body in this portion is not destroyed and the rubber crawler track can prevent a crack from occurring, thereby preventing a large crack from occurring in the circumferential direction in the rubber crawler track main body.

Figure 8:
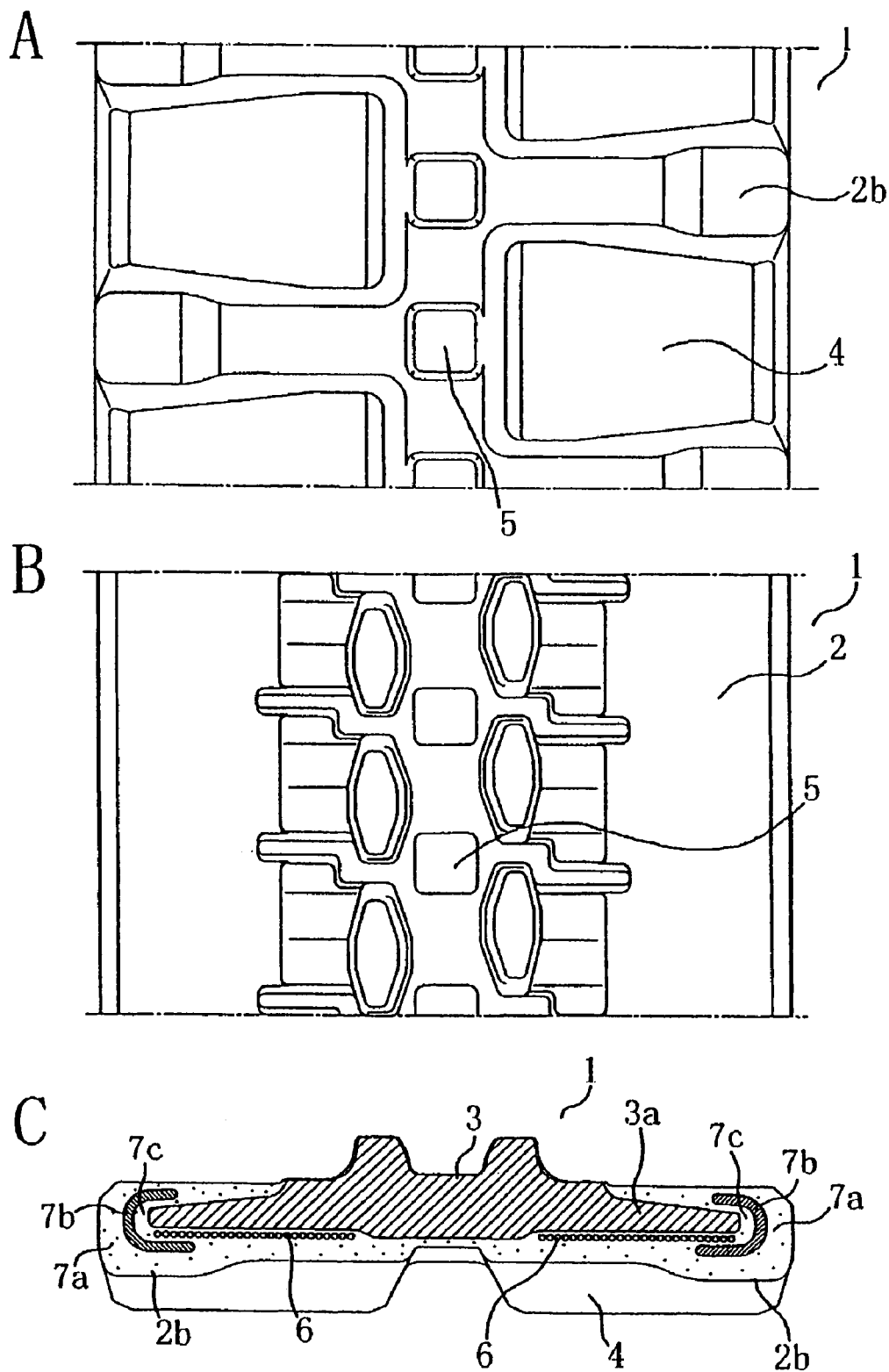
FIG. 8 show a rubber crawler track of a fourth embodiment.

FIG. 8 show a rubber crawler track of a fourth embodiment. FIG. 8A is a plan view of the ground contacting surface side, FIG. 8B is a plan view of the inside circumferential side (ground not contacting surface side) and FIG. 8C is a sectional view in a width direction of a rubber crawler track.

A rubber crawler track 1 of the fourth embodiment is so constructed that bulgy portions 2b are arranged between rubber lugs in a circumferential direction of the rubber crawler track, in addition to the structure of the rubber crawler track 1 of the first embodiment. Here, a bulgy portion 2b is formed on the end portion in the crawler track width direction of the rubber crawler track. That is, the bulgy portion 2b is formed by suitably increasing the rubber thickness (base thickness) of the ground contacting surface side of the rubber crawler track width direction, including a portion corresponding to the end portion of the core metal piece limb.

According to this, the rigidity in the end portion of the rubber crawler track including the end portion 3a' of the core metal piece limb comes to be high. Even if the rubber crawler track runs aground on stones or curbs, the end portions of the rubber crawler track are difficult to bend to the inside circumferential side of the crawler track. Accordingly, the end portions in the width direction of the rubber crawler track are prevented from partially bending, the strain on the rubber elastic body is decreased, and a large crack in the circumferential direction in the rubber crawler track main body can be effectively prevented.

Figure 9:
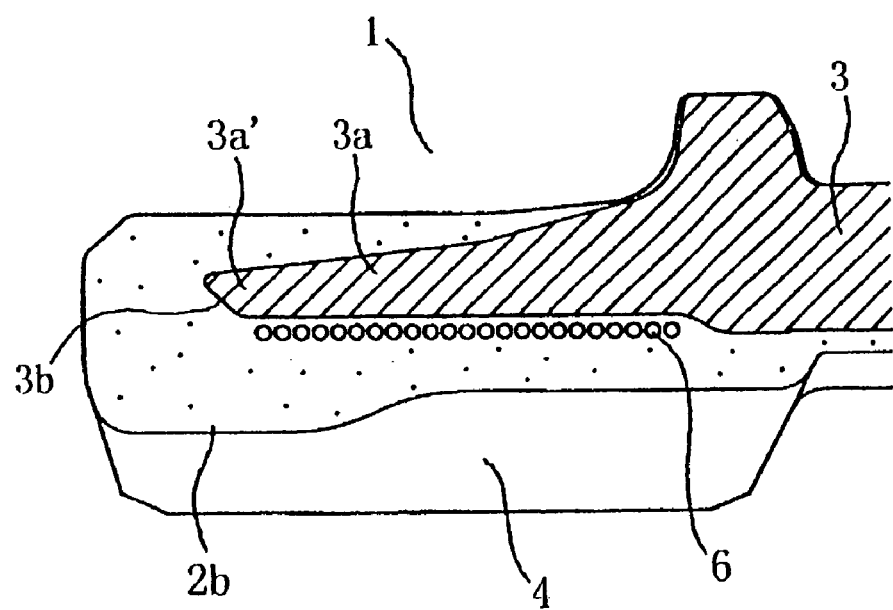
FIG. 9 is an enlarged sectional view of an important part in a width direction of a rubber crawler of a fifth embodiment.

FIG. 9 is an enlarged sectional view of an important part in a width direction of a rubber crawler of a fifth embodiment.

In the rubber crawler 1 of the fifth embodiment, the core metal pieces 3 of the third embodiment are embedded. And therein, the rubber thickness of the rubber crawler track main body 2 including the portion corresponding to the end portion 3a' of the core metal piece limb gradually increases toward the ground contacting surface side of a vertical direction of the rubber crawler track. Besides, bulgy portions 2b are formed between lugs 4 in the end portions of the rubber crawler track.

According to this, the inclinations 3b and the bulgy portions 2b have the strain dispersed more suitably on the rubber elastic body caught against stones or curbs. Therefore, in the end portions of the rubber crawler track, the degree of bending to the inside circumferential side is decreased, partial bending is prevented, and cracks are prevented from occurring. Accordingly, a large crack in the circumferential direction in the rubber crawler track main body is effectively prevented from occurring when the rubber crawler track 1 runs aground on the stones or the curbs, thereby enabling the durability of the rubber crawler track to improve.

Figure 10:
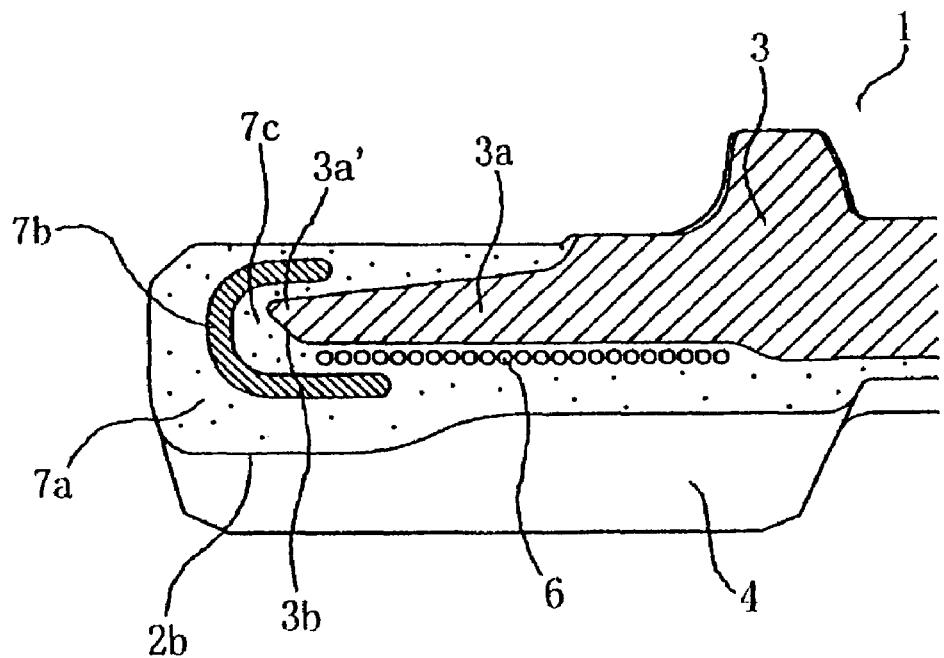
FIG. 10 is an enlarged sectional view of an important part in a width direction of a rubber crawler of a sixth embodiment.

FIG. 10 is an enlarged sectional view of an important part in a width direction of a rubber crawler track of a sixth embodiment.

The rubber crawler 1 of the sixth embodiment is so constructed that the core metal pieces 3 of the second embodiment are embedded in the rubber crawler track 1 of the first embodiment, and bulgy portions 2b are formed on the rubber crawler track main body.

That is, the inclinations 3b are respectively provided on the ground contacting surface side of the end portions 3a' of the core metal piece limb 3a embedded in the rubber crawler 1. Besides, the rubber elastic body covering the end portions 3a' is formed in a three-layer structure comprising an outside rubber layer 7a, an intermediate rubber layer 7b and an inside rubber layer 7c. Here, the rubber hardness of the intermediate rubber layer 7b is higher than those of the outside rubber layer 7a and the inside rubber layer 7c. Besides, the rubber thickness of the end portion of the rubber crawler track including the portion corresponding to the end portion 3a' of the core metal piece limb gradually increases toward the ground contacting surface side in the vertical direction of the rubber crawler track. And the bulgy portion 2b is formed between the lugs 4 of the end portion of the rubber crawler track.

In this embodiment, the rigidity of the rubber crawler track can improve because the ground contacting surface side of the rubber crawler track including the portion corresponding to the end portion of the core metal piece limb is made thick. Therefore, when the end portions of the rubber crawler track run aground on stones or curbs, the end portion of the rubber crawler track outside the tip of the core metal piece limb can be prevented from partially bending. Accordingly, the most suitable rubber crawler track effectively preventing a large crack from occurring in the circumferential direction in the rubber crawler track main body caused by the partial bending can be formed.

Figure 11:
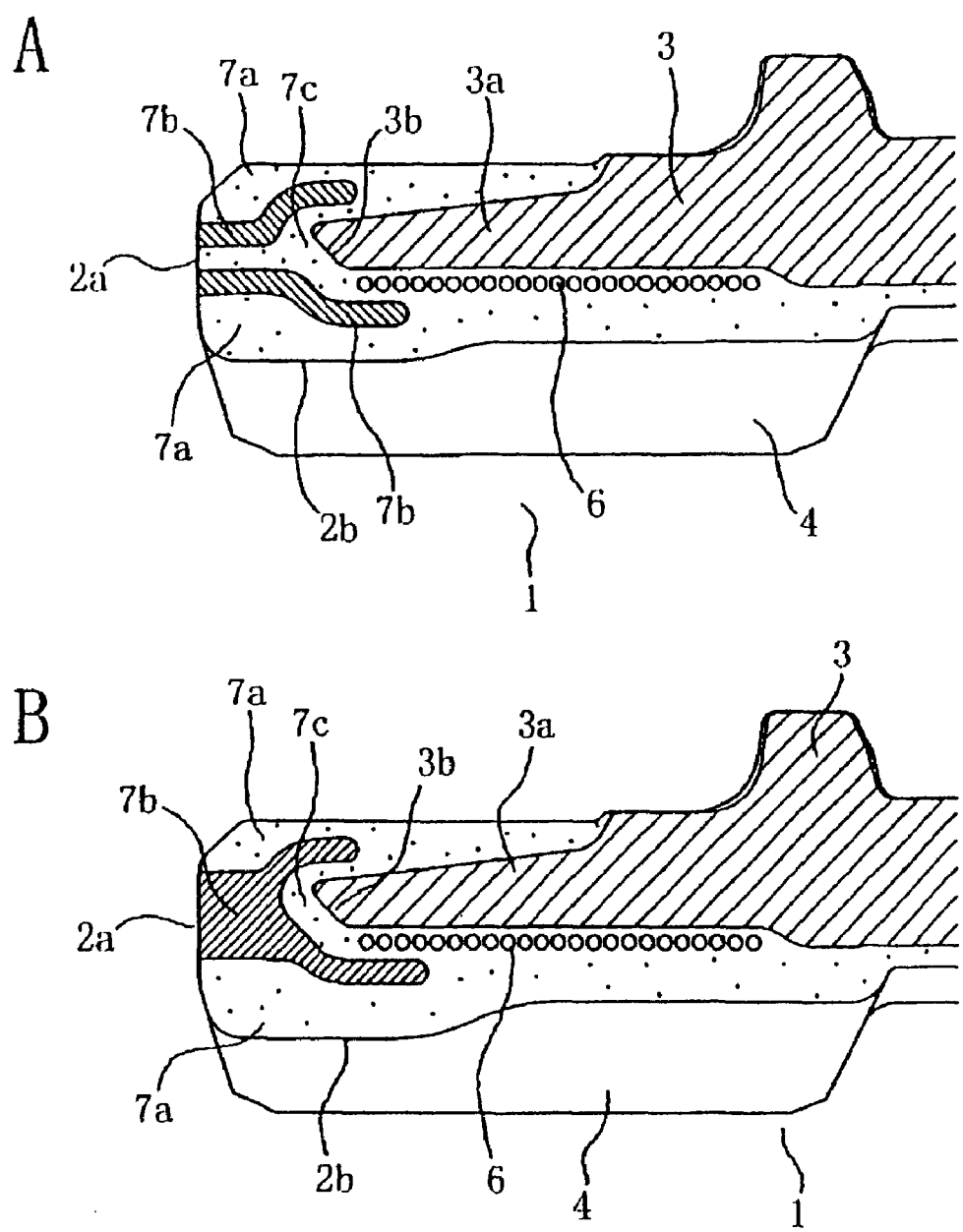
FIG. 11 is an enlarged sectional view of an important part in a width direction of a rubber crawler of another example of the sixth embodiment.

FIG. 11 are enlarged sectional views of an important part in a width direction of a rubber crawler track showing other examples of the sixth embodiment.

In an example shown in FIG. 11A, the rubber elastic body of the intermediate rubber layer 7b in the sixth embodiment is divided into an inside circumferential side and an outside circumferential side with respect to the vertical direction of the rubber crawler track to arrange a double-layer intermediate rubber layer. Here, the rubber elastic body of the intermediate rubber layer 7b extends to the end portion 2a of the rubber crawler track width direction.

In another example shown in FIG. 11B, the intermediate rubber layer 7b divided into a top and bottom in the example of FIG. 11A forms a large layer at the end portion of the rubber crawler track.

Figure 12:
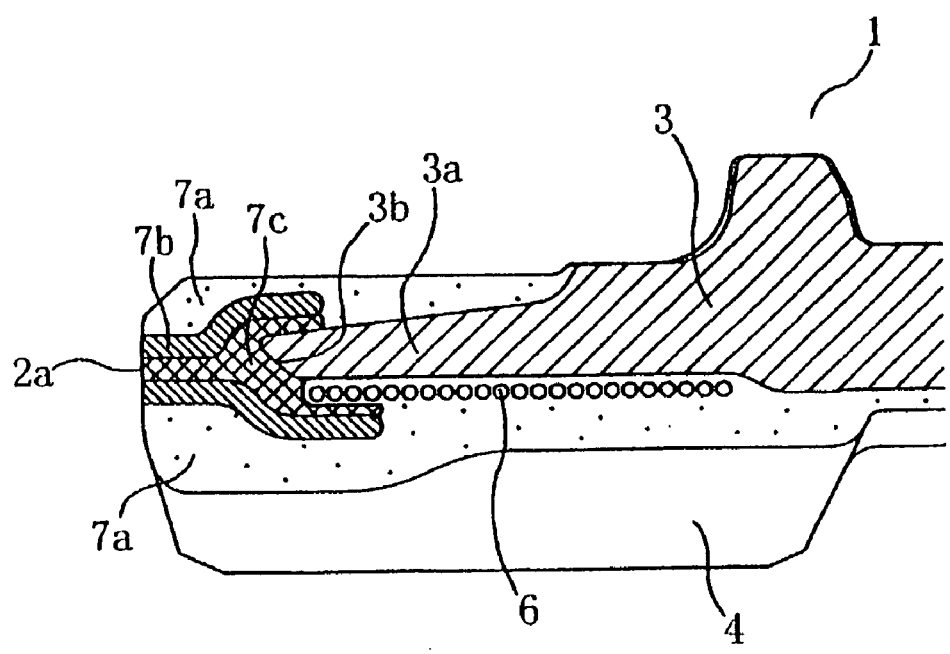
FIG. 12 is an enlarged sectional view of an important part in a width direction of a rubber crawler of a seventh embodiment.
Figure 13:
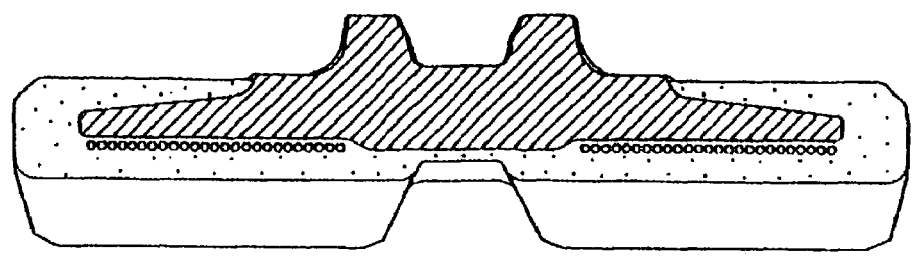
FIG. 13 is a sectional view in a width direction of a rubber crawler track showing a conventional rubber crawler track.
Figure 14:
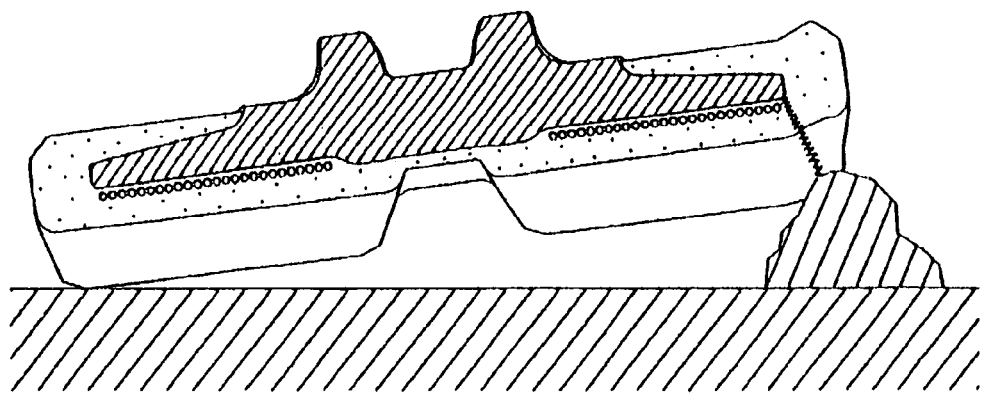
FIG. 14A is a sectional view in a width direction of a rubber crawler track, in a first situation that produces a large crack in the circumferential direction in the rubber crawler track main body in a conventional rubber crawler track.
FIG. 14B is a sectional view in a width direction of a rubber crawler track in a second situation that produces a large crack in the circumferential direction in the rubber crawler track main body in a conventional rubber crawler track.
Figure 14:
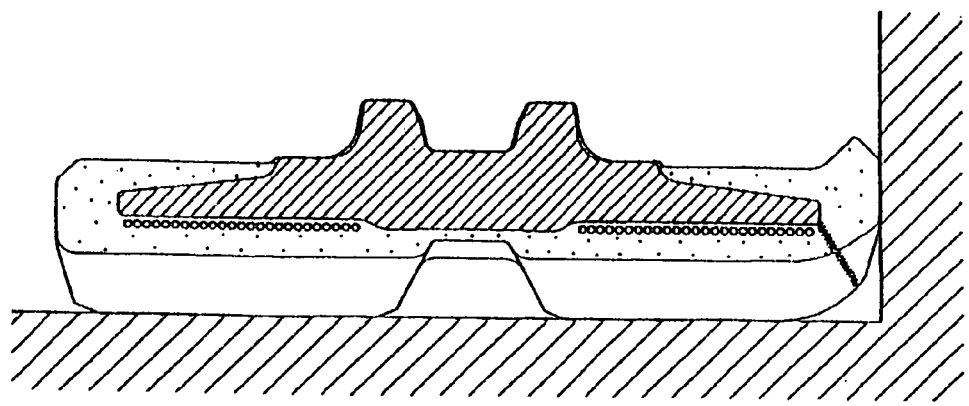

FIG. 12 is an enlarged sectional view of an important part in a width direction of a rubber crawler track of a seventh embodiment.

The rubber crawler track in the seventh embodiment comprises the outside rubber layer 7a, the intermediate rubber layer 7b and the inside rubber layer 7c with different configurations and hardness, respectively.

In particular, the intermediate rubber layer 7c is formed of a rubber elastic body in consideration of adhesion to the core metal piece (steel etc.), and the outside rubber layer 7a is formed of a rubber elastic body superior in cutting resistance and is difficult to be externally damaged.

The rubber hardness (JIS K6253:1997; Durometer A hardness) of the outside rubber layer 7a in this embodiment is 66 degrees, that of the intermediate rubber layer is 83 degrees, and that of the inside rubber layer is 70 degrees.

According to this embodiment, the adhesive portion between the tip of the core metal piece limb and the rubber elastic body caused by the bend of the end portion of the rubber crawler track generated when the rubber crawler track runs aground on stones or a curb or is pressed against them is prevented from peeling. Besides, a large crack in the circumferential direction in the rubber crawler track main body caused by this is also prevented from occurring.

Figure 16:
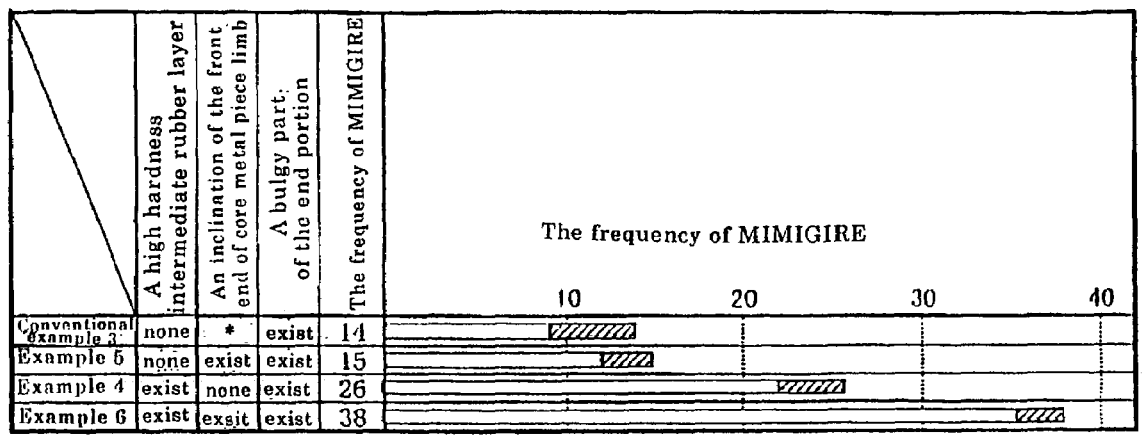
FIG. 16 is a diagram showing an examination result regarding a performance test concerning resistance to a large crack forming in the circumferential direction in the rubber crawler track main body comparing the present invention with a conventional product.

Table 1 in FIG. 16 shows the results of a quality resistance test concerning resistance to a large crack forming in the circumferential direction in the rubber crawler track main body comparing the embodiment of the present invention and the conventional embodiment.

Figure 15:
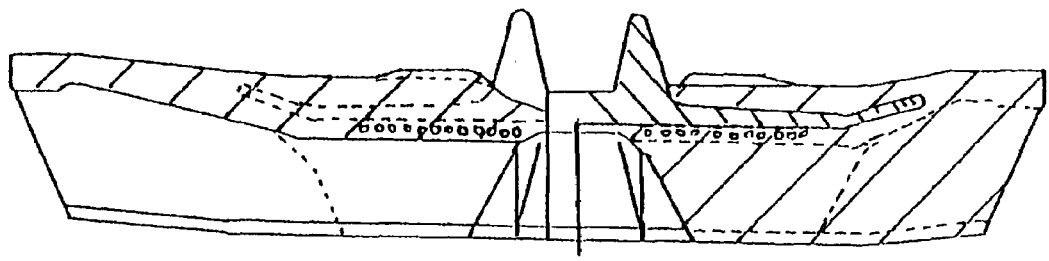
FIG. 15 is a sectional view of a width direction of a conventional rubber crawler that takes measures to cope with a large crack in the circumferential direction in the rubber crawler track main body.

As quality resistance tests, the following two kinds of tests are performed on the rubber crawler tracks from the fourth embodiment to the sixth embodiment and a rubber crawler track shown in FIG. 15 (a conventional embodiment 3) with a countermeasure for preventing a large crack from occurring in the circumferential direction in the rubber crawler track main body disclosed in Japanese Patent Laid-open Publication No. 079015 of 1999. The frequency that the depth of each crack of the following tests (1), (2) reaches 20 mm and the frequency that the depth×the length thereof reaches 40 cm$^2$ are calculated from a relationship among the frequency of tests, the depth of a broken portion of the end portion (lug portion) of the rubber crawler track and the depth×the length of the broken portion, and then, the frequency calculated by making these frequencies in arithmetical mean is estimated as the frequency of a large crack occurring in the circumferential direction in the rubber crawler track main body.

(1) A test for adding a load on an end portion (lug portion), wherein an outside end portion (lug portion) of the rubber crawler track mounted on a hydraulic excavator is made to run aground on a curb, an arm of the excavator is rotated 90 degrees to the traveling direction so as to be located upward of the rubber crawler track, and then, the arm is made to shake from the upside to the downside and to suddenly stop before the excavator contacts on the ground.

(2) A test for longitudinally reciprocating a hydraulic excavator while making an outside end portion of a rubber crawler track of one side of the excavator run aground on boulders and maintaining this condition.

Obviously from Table 1, in comparison with that of the conventional embodiment 3, the rubber crawler track of the fourth embodiment of the present invention has a twofold effect for quality resistance to a large crack occurring in the circumferential direction in the rubber crawler track main body. Accordingly, a rubber crawler track for economically and effectively preventing a large crack from occurring in the circumferential direction in the rubber crawler track main body can be provided.

Besides, the rubber crawler track of the fifth embodiment of the present invention has almost equal quality resistance to the rubber crawler of the conventional embodiment 3 including core metal pieces whose end portions are bent to the inside circumferential side. Moreover, the core metal piece shape of the fifth embodiment is simple in comparison with that of the conventional embodiment 3. Therefore, a rubber crawler track having good quality resistance to a large crack occurring in the circumferential direction in the rubber crawler track main body can be provided without cost.

Furthermore, the rubber crawler track of the sixth embodiment has quality resistance to a large crack occurring in the circumferential direction in the rubber crawler track main body that is 2.7 times that of the conventional embodiment.

In the present invention, in a rubber crawler track comprising core metal pieces embedded in a rubber crawler track main body at predetermined intervals in a circumferential direction of the rubber crawler track, by interposing a high hardness intermediate rubber layer formed of a high hardness rubber elastic body having higher hardness than other rubber elastic bodies forming the rubber crawler track main body from below at least the ground contacting surface side of an end portion in a length direction of the core metal pieces toward outside the end portion in a width direction of the rubber crawler track, even if the rubber crawler track runs aground on stones or curbs, rubber put between limbs of the core metal pieces and the stones or the curbs is prevented from being broken. Therefore, the occurrence of a large crack in the circumferential direction in the rubber crawler track main body is diminished, and the span of life of the rubber crawler track is prolonged.

The effect of the present invention can be accomplished by merely adjusting rubber hardness of the rubber elastic body in the intermediate rubber layer. Therefore, the cost is not expensive, thereby economically and effectively preventing a large crack from occurring in the circumferential direction in the rubber crawler track main body.

Besides, by improving the core metal pieces' shape, such as by making the ground contacting side of the end portion of a length direction of the core metal piece limb in a downward inclination within a fixed length, destruction of the rubber between the core metal piece limb and the stones or the curbs can be diminished. Therefore, the span of life of the rubber crawler track can be prolonged economically.

Moreover, by making thick a base rubber of the ground contacting surface side of the end portion in the crawler track width direction, including a portion corresponding to the end portion of the core metal piece limb, the rigidity of the end portion of the rubber crawler track is increased. Even if the rubber crawler track runs aground or is pushed against the stones or the curbs, the side end portion of the rubber crawler track is difficult to bend to the inside circumference. Therefore, the occurrence of a large crack in the circumferential direction in the rubber crawler track main body is diminished and the rigidity is improved.

The invention claimed is:

1. A rubber crawler track, comprising:
   a rubber crawler track main body formed of a rubber elastic body; and
   core metal pieces embedded in said rubber crawler track at predetermined intervals in a circumferential direction of the rubber crawler track, the core metal pieces having a ground-facing side,
   wherein a high hardness intermediate rubber layer formed of a high hardness rubber elastic body is provided in said rubber elastic body from below at least the ground-facing side of an end portion of the core metal pieces, in a length direction of said core metal pieces, to outside the end portion of the core metal pieces in a width direction of the rubber crawler track,
   wherein a first portion of the high hardness intermediate rubber layer lies underneath an end portion of the core metal pieces in a length direction of the core metal pieces, a second portion of the high hardness intermediate rubber layer extends upward from said first portion and outside the end portion in a width direction of the rubber crawler track, and said second portion adjoins said first portion, and
   wherein an upper portion of said rubber elastic body lies above said high hardness intermediate rubber layer, a lower portion of said rubber elastic body lies below said high hardness intermediate rubber layer, and said high hardness rubber elastic body has higher hardness than both said upper and lower portions of said rubber elastic body.

2. A rubber crawler track as claimed in claim 1, wherein said end portion in the length direction of the core metal pieces is formed in a downward inclination having a fixed length.

3. A rubber crawler track as claimed in claim 1, further comprising rubber lugs spaced from one another in the circumferential direction of the rubber crawler track, wherein the thickness of an end portion of the rubber crawler track, in a width direction of the rubber crawler track, is increased on the ground-facing side of the rubber crawler track to form a bulgy portion, and said bulgy portion is provided between rubber lugs in the circumferential direction of the rubber crawler track.

* * * * *